(12) United States Patent
Horii et al.

(10) Patent No.: US 7,248,423 B2
(45) Date of Patent: Jul. 24, 2007

(54) OUTSIDE MIRROR SYSTEM

(75) Inventors: Takayoshi Horii, Saitama (JP); Junichi Teraoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/339,460

(22) Filed: Jan. 25, 2006

(65) Prior Publication Data

US 2006/0164739 A1 Jul. 27, 2006

(30) Foreign Application Priority Data

Jan. 25, 2005 (JP) ............................. 2005-017321

(51) Int. Cl.
*G02B 5/04* (2006.01)
*G02B 7/182* (2006.01)
*G02B 17/00* (2006.01)
*B60R 1/06* (2006.01)

(52) U.S. Cl. .................. 359/833; 359/850; 359/872; 359/727

(58) Field of Classification Search ................ 359/726, 359/727, 831, 833, 850, 855, 857, 861, 872
See application file for complete search history.

(56) References Cited

U.S. PATENT DOCUMENTS

| | | | | | |
|---|---|---|---|---|---|
| 2,622,482 | A | * | 12/1952 | Balkin ........................ | 359/720 |
| 3,659,929 | A | * | 5/1972 | Yuzawa ...................... | 359/865 |
| 3,809,461 | A | * | 5/1974 | Baumgardner et al. ..... | 359/737 |
| 5,526,195 | A | * | 6/1996 | Thomas ...................... | 359/850 |
| 5,594,593 | A | * | 1/1997 | Milner ....................... | 359/726 |
| 5,594,594 | A | * | 1/1997 | Ung ........................... | 359/855 |
| 5,617,245 | A | * | 4/1997 | Milner ....................... | 359/402 |
| 5,666,227 | A | * | 9/1997 | Ben-Ghiath ................ | 359/630 |
| 6,033,078 | A | * | 3/2000 | Su et al. .................... | 359/856 |
| 6,104,552 | A | * | 8/2000 | Thau et al. ................. | 359/726 |
| 6,424,474 | B1 | * | 7/2002 | Milner ....................... | 359/831 |
| 2006/0034005 | A1 | * | 2/2006 | Patrikakis ................... | 359/844 |

FOREIGN PATENT DOCUMENTS

| | | | |
|---|---|---|---|
| DE | 3146486 | * | 1/1983 |
| DE | 102004004549 | * | 8/2004 |
| EP | 0283467 | * | 9/1988 |
| FR | 2676030 | * | 11/1992 |
| JP | 05-338495 | * | 12/1993 |
| JP | 9290687 | | 11/1997 |
| JP | 2002-067794 | * | 3/2002 |
| JP | 2006-205785 | * | 8/2006 |

* cited by examiner

*Primary Examiner*—Ricky D. Shafer
(74) *Attorney, Agent, or Firm*—Carrier, Blackman & Associates, P.C.; Joseph P. Carrier; William D. Blackman

(57) ABSTRACT

A transparent member has a light incident surface formed in such a manner as to be oriented downwards, a light emitting surface formed in such a manner as to be oriented towards a driver M and a reflecting mirror surface having a reflecting member integrally attached thereto which is formed into a convex surface relative to the driver on an opposite side to the light emitting surface. The light incident surface is formed into the shape of an integrally angled concave surface. The light emitting surface is formed into the shape of an externally angled convex surface. The reflecting mirror surface includes a central convex mirror surface portion which is oriented further downwards at a central portion of the reflecting mirror surface.

11 Claims, 7 Drawing Sheets

PRIOR ART

OUTSIDE MIRROR SYSTEM

The present application claims foreign priority based on Japanese Patent Application No. 2005-017321, filed Jan. 25, 2005, the content of which is incorporated herein by reference.

BACKGROUND OF THE INVENTION

1. Technical Field

The present invention relates to an outside mirror system including a mirror which is disposed on an outside of a vehicle to reflect a rearward view and a mirror which is disposed integrally underneath the mirror to reflect an outside downward view relative to the vehicle.

2. Related Art

There is known an outside mirror system including a rearview mirror which reflects a rearward view relative to a vehicle and a downward-view mirror which reflects an outside downward view relative to the vehicle (refer, for example, to JP-A-9-290687 (Page 4, FIGS. 5, 7) which is referred as Patent Document No. 1).

Patent Document No. 1 will be described based on the following figures.

FIGS. 10(a), (b) are diagrams which explain a basic configuration of a related art. A related-art outside mirror system 101 is such that an outside mirror 103 which confirms a vision to the rear of a vehicle body and a prism glass 104 which confirms a vision to the front of the vehicle body are mounted on an outside mirror main body 102. The prism glass 104 is such that an upper surface 105 and a rear surface 106 are made up, respectively, of flat planes and are formed into an L-shape and a front surface 107 is formed into a free curved surface which projects towards the front of the vehicle body. Consequently, the outside mirror system 101 is such as to realize a reduction in the number of parts and reduce the movement of the driver's eyes.

In the outside mirror system 101 of Patent Document No. 1, however, when attempting to provide a wider view for the driver, the size of the prism glass (the transparent member) 104 is increased, which deteriorates the external appearance of the vehicle is deteriorated, and the external aerodynamic friction force is increased.

In addition, when the outside mirror system 101 becomes large, the range of a dead angle for the driver is increased, making it difficult for the driver to drive the vehicle.

Even with a construction in which the prism glass 104 is combined with a reflecting mirror (including a convex mirror), when attempting to provide a wider view, the reflecting mirror becomes large in size, resulting in an increase in the size of the outside mirror system.

SUMMARY OF THE INVENTION

An object of the invention is to provide an outside mirror system which can increase a range where an outside downward view is reflected without increasing the size of a transparent member (a mirror) which reflects an outside downward view relative to the vehicle and which can reflect an enlarged image of the outside downward view without increasing the size of the transparent member, even in the event that the transparent member is disposed integrally on a mirror which reflects a rearward view relative to the vehicle.

However, the present invention need not achieve the above object, and other objects not described herein may also be achieved. Further, the invention may achieve no disclosed objects without affecting the scope of the invention.

With a view to attaining the object, according to a first aspect of the invention, there is provided an outside mirror system having attached thereto a mirror which reflects a rearward view relative to a vehicle and a transparent member which reflects an outside downward view relative to the vehicle, wherein the transparent member has a light incident surface which is formed so as to be oriented downwards, a light emitting surface which is formed so as to be oriented towards a driver and a reflecting mirror surface which has a reflecting member integrally attached thereto on an opposite side to the light emitting surface and is formed into a convex surface relative to the driver.

According to a second aspect of the invention, there is provided an outside mirror system as set forth in the first aspect of the invention, wherein the light emitting surface is formed into the shape of an externally angled convex surface.

According to a third aspect of the invention, there is provided an outside mirror system as set forth in the first or second aspect of the invention, wherein the light incident surface is formed into the shape of an internally angled concave surface.

According to a fourth aspect of the invention, there is provided an outside mirror system as set forth in the first, second or third aspect of the invention, wherein the reflecting mirror surface includes at a central portion thereof a central convex mirror surface portion which is oriented further downwards than end portions thereof.

According to a fifth aspect of the invention, there is provided an outside mirror system as set forth in the first, second, third or fourth aspect of the invention, wherein assuming that a radius of the central portion of the reflecting mirror surface is Rm and a radius of the end portions thereof which continue to the central portion is R, the radius R is made larger than the radius Rm.

According to the first aspect of the invention, since the transparent member of the outside mirror system has the light incident surface which is formed so as to be oriented downwards, the light emitting surface which is formed so as to be oriented towards the driver and the reflecting mirror surface which has the reflecting member integrally attached thereto on the opposite side to the light emitting surface and is formed into the convex surface relative to the driver, there is provided an advantage that the reflecting mirror surface functions in the same manner as a convex mirror surface relative to the driver to thereby widen the range of objects to be reflected.

According to the second aspect of the invention, since the light emitting surface is formed into the shape of the externally angled convex surface, the light emitting surface functions as a convex lens, whereby there is provided an advantage that the image of the outside downward view that is reflected on the reflecting mirror surface can be enlarged without enlarging the transparent member to thereby reflect the enlarged image of the outside downward view.

According to the third aspect of the invention, since the light incident surface is formed into the shape of the internally angled concave surface, the light incident surface functions in the same manner as a concave lens, whereby the range of objects to be reflected can be widened without enlarging the transparent member.

According to the fourth aspect of the invention, the reflecting mirror surface includes at the central portion thereof the central convex mirror surface portion which is oriented further downwards than the end portions thereof. As a result, a phenomenon generated when the reflecting mirror surface is constituted by a convex mirror in which an extent to which the vehicle body is reflected is increased and the contour of the vehicle body so reflected is distorted, resulting in a largely bent image of the vehicle body can be suppressed due to the central convex mirror surface portion which is oriented further downwards being included at the central portion of the reflecting mirror surface, whereby the bending of the contour of the vehicle body can be suppressed to thereby obtain an image of the vehicle body having an intrinsic contour thereto.

According to the fifth aspect of the invention, since, assuming that the radius of the central portion of the reflecting mirror surface is Rm and the radius of the end portions thereof which continue to the central portion is R, the radius R is made larger than the radius Rm, the function of the convex mirrors at the end portions is suppressed. As a result, images reflected at the left and right end portions of the light emitting surface become small in no case, whereby the driver is allowed to see the images reflected at both the end portions in a natural proportion to other objects reflected similarly.

DETAILED DESCRIPTION OF THE INVENTION

A best mode for carrying out the invention will be described based on the accompanying drawings.

Figure 1:
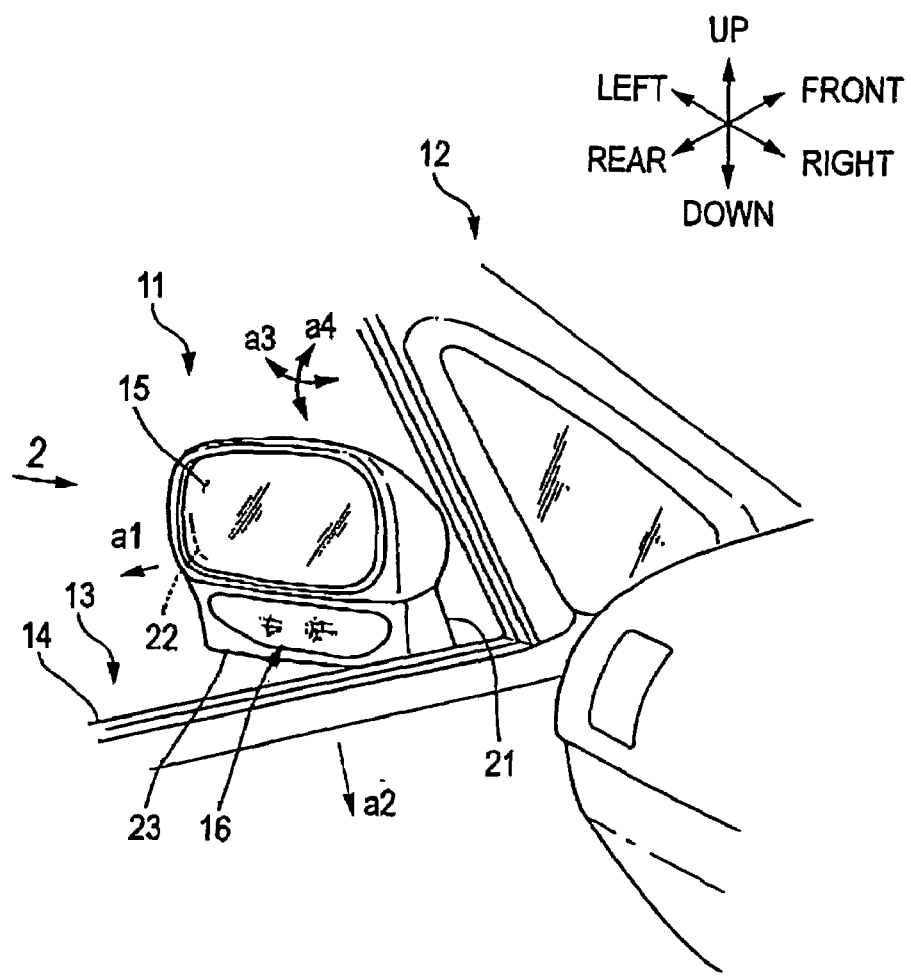
FIG. 1 is a perspective view of an exemplary, non-limiting outside mirror system of the invention.

FIG. 1 is a perspective view of an exemplary, non-limiting outside mirror system of the invention. Direction indicating words "Up", "Down", "Left" and "Right" written in a top right-hand side corner of the drawing indicates directions as viewed from the driver's side, and "Front" indicates a direction in which a vehicle moves forwards, whereas "Rear" indicates an opposite direction thereto.

An outside mirror system 11 is mounted on a left front side door 13 of a vehicle 12 to reflect a left side rearward view (in a direction indicated by an arrow a1) relative to the vehicle 12 and an outside downward view (in a direction indicated by an arrow a2) relative to the vehicle 12. To be specific, the outside door mirror system 11 is mounted on an outer panel 14 of the left front side door 13 of the vehicle, and the left side rearward view relative to the vehicle 12 is reflected on a rearview mirror 15 and the outside downward view relative to the vehicle 12 is reflected on a transparent member 16.

In addition, the outside mirror system 11 includes a support member 21 mounted on the outer panel 14, the rearview mirror 15 mounted on the support member 21 and the transparent member 16 which is disposed underneath the rearview mirror 15 and is integrally fixed to the support member 21.

The support member 21 includes a mirror holding member 22 and an oscillating device (not shown) which hold and freely oscillate the rearview mirror 15 (in directions indicated by arrows a3 and a4), and a lower holding portion 23 which holds the transparent member 16.

Figure 2:
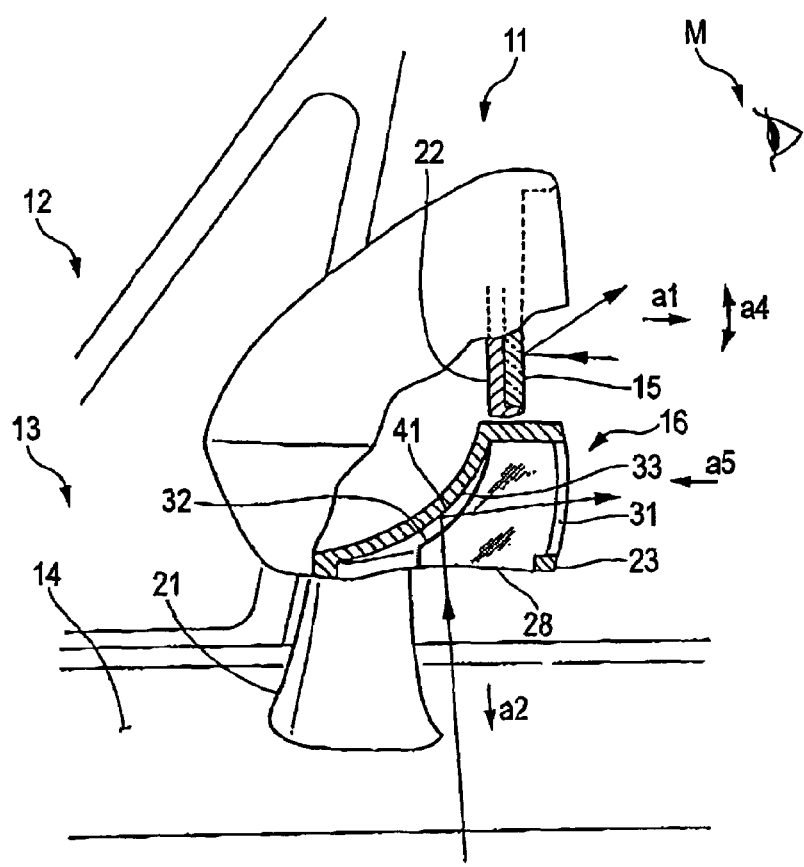
FIG. 2 is a view resulting when the outside mirror system is viewed in a direction indicated by an arrow 2 in FIG. 1.

FIG. 2 is a partially sectional side view of the outside mirror system 11 resulting when FIG. 1 is viewed in a direction indicated by an arrow 2 therein and showing a main part thereof in section.

The rear view mirror 15 is a mirror which reflects a rearward view relative to the vehicle 12 and whose mirror surface is substantially flat, and the oscillating device is actuated based on information inputted by a driver M, whereby the rearview mirror 15 is oscillated in a direction indicated, for example, by an arrow a4.

The transparent member 16 is such as to have a light incident surface 28 which is formed in such a manner as to be oriented downwards in a direction indicated by an arrow a2, a light emitting surface 31 which is formed in such a manner as to be oriented towards the driver M and a reflecting mirror surface 33 which has a reflecting member 32 integrally attached thereto on an opposite side (in a direction indicated by an arrow a5) to the light emitting surface 31 and is formed into a convex surface relative to the driver. The transparent member 16 will be described specifically below.

Figure 3:
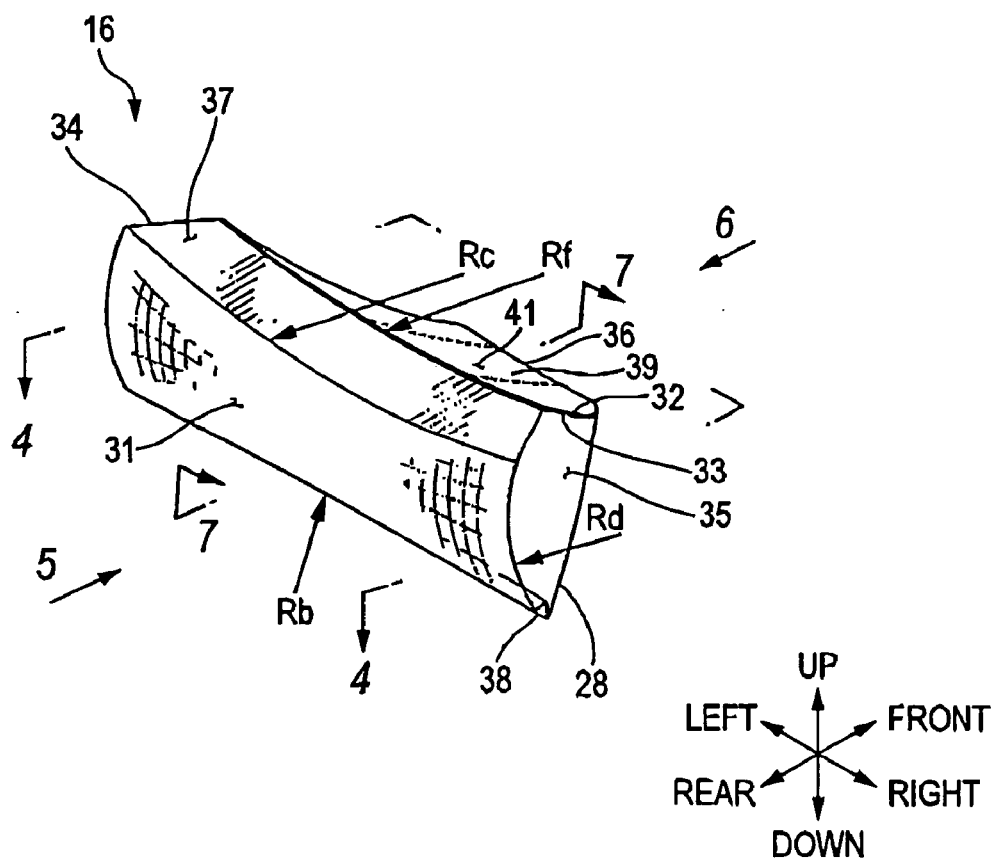
FIG. 3 is a perspective view of a exemplary, non-limiting transparent member used on the outside mirror system of the invention.

FIG. 3 is a perspective view of the exemplary, non-limiting transparent member used on the outside mirror system of the invention.

The transparent member 16 includes the light incident surface 28, the light emitting surface 31, the reflecting mirror surface 33, side surfaces 34, 35, 36 which continue to those surfaces and which are formed substantially vertical and flat, an upper surface 37 which is formed substantially horizontal and flat and a step-like hook portion 38 which is formed at an angle formed by the light incident surface 28 and the light emitting surface 31.

Figure 7:
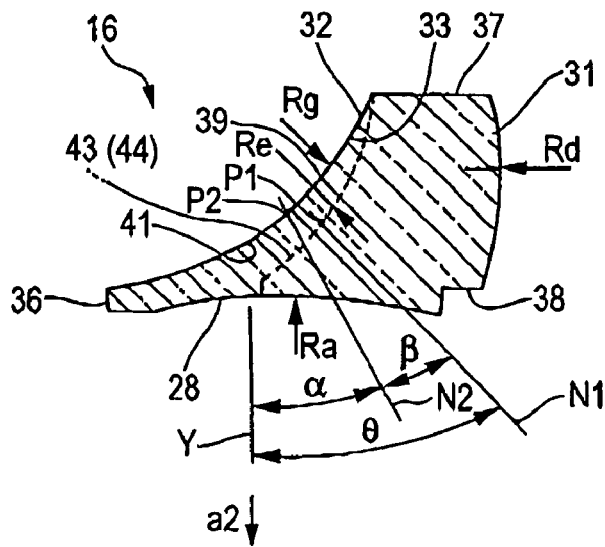
FIG. 7 is a sectional view taken along the line 7-7 in FIG. 3.

The light incident surface 28 is a portion which is formed into the shape of an internally angled concave surface and constitutes a free curved surface in which different radii are continuously linked with each other. Reference character Ra (refer to FIG. 7) denotes an average radius of the shape of the concave surface relative to a longitudinal direction thereof, and reference character Rb denotes an average radius of the shape of the concave surface relative to a transverse direction thereof.

The light emitting surface 31 is a portions which is formed into the shape of an externally angled convex surface and constitutes a free curved surface in which different radii are continuously linked with each other. Reference character Rc denotes an average radius of the shape of the convex surface relative to a transverse direction thereof, and reference character Rd denotes an average radius of the shape of the convex surface relative to a vertical direction thereof.

The reflecting mirror surface 33 is a portion which is formed into the shape of an internally angled concave surface and constitutes a free curved surface in which different radii are continuously linked with each other. The reflecting mirror surface 33 is also a portion to which the reflecting member 32 is integrally attached. Reference character Re (refer to FIG. 7) denotes an average radius of the shape of the concave surface relative to vertical and transverse directions thereof, and reference character Rf denotes an average radius of the shape of the concave surface relative to the transverse direction thereof.

In addition, the reflecting mirror surface 33 has a central convex mirror surface portion 41 formed at a central portion 39 thereof.

A transparent resin is used for the material of the transparent member 16. Using the transparent resin can facilitate the molding of a free curved surface having different radii.

Note that a transparent glass can be used depending upon conditions (shapes).

Figure 4:
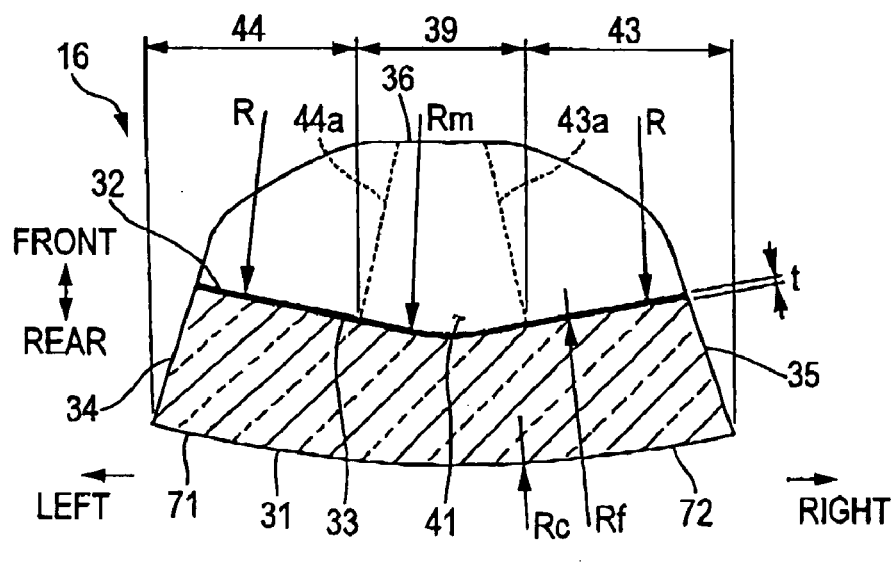
FIG. 4 is a sectional view taken along the line 4-4 in FIG. 3.

FIG. 4 is a sectional view taken along the line 4-4 in FIG. 3.

The reflecting mirror surface 33 is further characterized in that assuming that a radius of the central portion 39 (indicated by a range) relative to a transverse direction thereof is Rm and a radius of end portions 43, 44 which continue to the central portion 39 relative to a transverse direction thereof is R, the radius R is made larger than the radius Rm.

In addition, while a boundary line 43a is shown as being drawn along a boundary between the central portion 39 and the end portion 43 using a broken line, this line is drawn visibly so as to be understood clearly. The central portion 39 and the end portion 43 are portions which are connected together via a smooth radius or R, and therefore, a ridge (the boundary line 43a) constitutes a location which is difficult to be visualized. The broken line used for the boundary line 43a herein is used differently from the use in drawing.

While a boundary line 44a is shown as being drawn along a boundary between the central portion 39 and the end portion 44 using a broken line, the boundary line 44a is a line drawn for the same purpose as that of the boundary line 43a.

The reflecting member 32 is a reflecting membrane which reflects an image and is such as to be bonded to the reflecting mirror surface 33. The membrane may be formed from arbitrary materials and via arbitrary processing methods. Reference character t denotes the thickness of the membrane.

Figure 5:
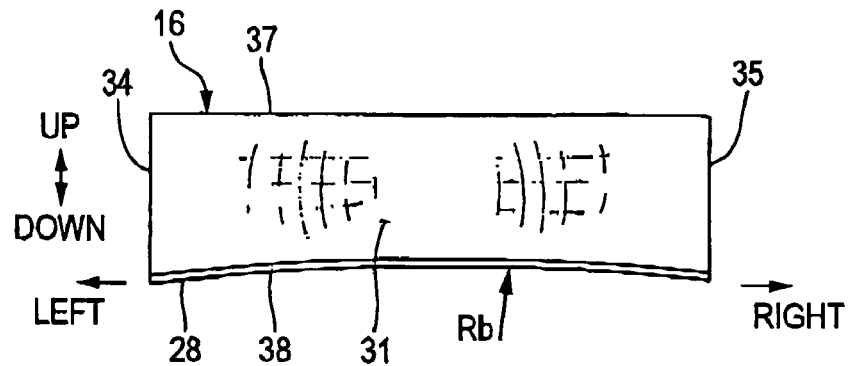
FIG. 5 is a view resulting when the outside mirror system is viewed in a direction indicated by an arrow 5 in FIG. 3.

FIG. 5 is a view when the transparent member 16 is viewed in a direction indicated by an arrow 5 in FIG. 3.

As has already been described, the light incident surface 28 is the portion which is formed into the shape of the internally angled concave surface and is molded with the average radius of Rb.

Figure 6:
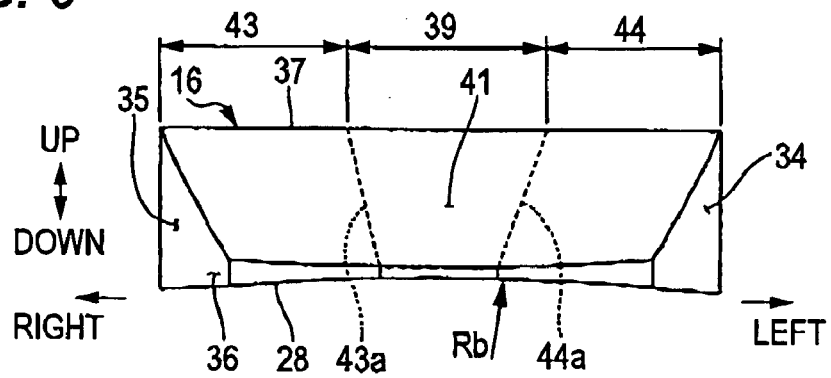
FIG. 6 is a view resulting when the outside mirror system is viewed in a direction indicated by an arrow 6 in FIG. 3.

FIG. 6 is a view resulting when the transparent member 16 is viewed in a direction indicated by an arrow 6 in FIG. 3.

The reflecting mirror surface 33 (refer to FIG. 4) has the central convex mirror surface portion 41 at the central portion 39. The central convex mirror surface portion 41 will be described specifically using the following figure.

FIG. 7 is a sectional view taken along the line 7-7 in FIG. 3.

The reflecting mirror surface 33 is also such as to have the central convex mirror surface portion 41 formed at the central portion 39 thereof in such a manner as to be oriented further downwards than the end portions 43, 44 thereof.

The central convex mirror surface portion 41 constitutes a free curved surface in which different radii are continuously linked with each other. Reference character Rg denotes an average radius of the central convex mirror surface portion 41 relative to vertical and longitudinal directions thereof. The average radius of the central convex mirror surface portion 41 is Rg<Re.

The expression, "be oriented further downwards than the end portions 43, 44", denotes a state in which when the transparent member 16 is placed horizontally, the orientation (a normal N1) of the convexity of the reflecting mirror surface 33 is set at an angle θ relative to a vertical line Y, the orientation (a normal N2) of the central convex mirror surface portion 41 is set at an angle α(α<θ), and the central convex mirror surface portion 41 is oriented further downwards (in a direction indicated by the arrow a2) by an angle β than the reflecting mirror surface 33.

Here, the normal N1 is a line which connects a substantially central position P1 of the reflecting mirror surface 33 with a center of the average radius Re and is to constitute a normal to the position P1 of a curve with the average radius Re.

The normal N2 is a line which connects a substantially central position P2 of the central convex mirror surface portion 41 with a center of the average radius Rg and is to constitute a normal to the position P2 of a curve with the average radius Rg.

Figure 8:
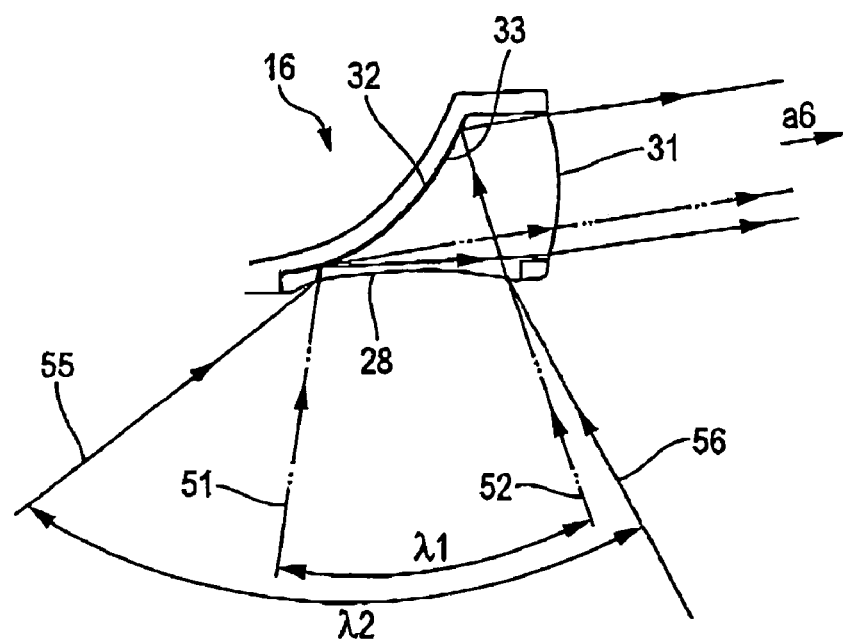
FIG. 8 is a diagram which shows a primary function of the outside mirror system of the invention.

FIG. 8 is a diagram which illustrates a primary function of the outside mirror system of the invention in an exemplary fashion.

In the transparent member 16, since the reflecting mirror surface 33, to which the reflecting member 32 is integrally attached, is formed into the convex surface relative to the driver (in a direction indicated by an arrow a6 (also refer to FIG. 9(a))), the reflecting mirror surface 33 functions in the same manner as a convex mirror to the driver M (refer to FIG. 9(a)), and an angle λ1 at which rays of reflected light 51, 52 from objects are incident on the reflecting mirror surface 33 is increased, thereby making it possible to widen ranges of objects to be reflected.

Since the reflecting mirror surface 33 is the free curved surface, a position to be reflected can be specified by setting the curved surface arbitrarily, and at the same time, the distortion of an image to be reflected on the reflecting mirror surface 33 can be corrected so as to provide an image which looks like an actual image for the driver.

In the transparent member 16, since the light emitting surface 31 is the portion which is formed into the shape of the externally angled convex surface, the light emitting surface 31 functions as a convex lens, and an image of an outside downward view that is reflected on the reflecting mirror surface 33 can be enlarged without enlarging the transparent member 16.

In the transparent member 16, since the light incident surface 28 is the portion which is formed into the shape of the internally angled concave surface, the light incident surface 28 functions in the same manner as a concave lens, and an angle λ2 (λ2>λ1) at which rays of reflected light 55, 56 from objects are incident on the reflecting mirror surface 33 is increased, thereby making it possible to widen ranges of objects to be reflected without enlarging the transparent member 16.

Since the light incident surface 28 is the free curved surface, a position to be reflected can be specified by setting the curved surface arbitrarily, and at the same time, the field of view of the position so specified can be widened.

FIGS. 9(a) to 9(d) are diagrams which illustrate a secondary function of the outside mirror system of the invention, in which FIG. 9(a) is a diagram which describe objects lying outside below on a left-hand side of the vehicle 12, FIG. 9(b) is a diagram which shows a transparent member 201 of a comparison example, FIG. 9(c) is a diagram which explains the comparison example, and FIG. 9(d) is a diagram which explains the function of the embodiment (the outside mirror system 11) of the invention.

In FIG. 9(a), objects 57, 58, 61, 62 are present outside below (in the direction indicated by the arrow a2) on the left-hand side of the vehicle 12 sequentially in that order as viewed from the front thereof. Reference numerals 63, 64, 65, 66 denote lower corners of the respective objects.

Figure 9:
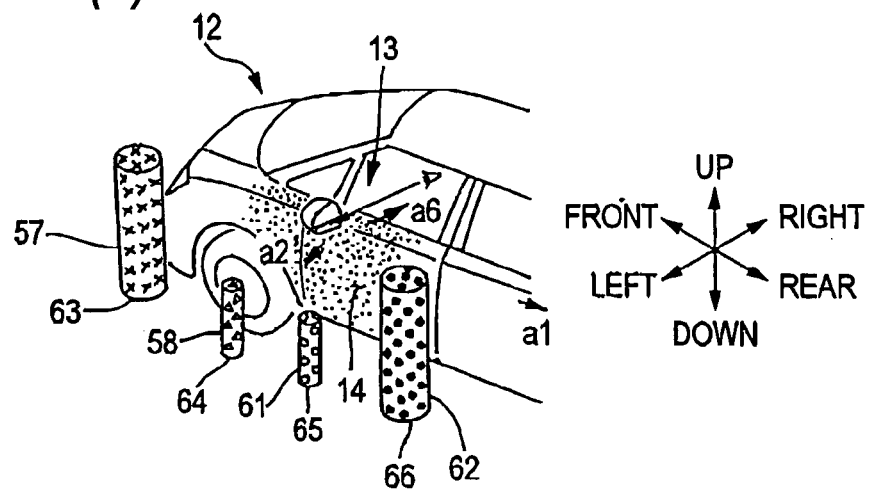
FIGS. 9(a), 9(b), 9(c) and 9(d) are diagrams which show a secondary function of the outside mirror system of the invention.
Figure 9:
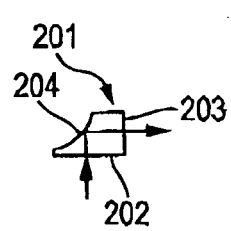
Figure 9:
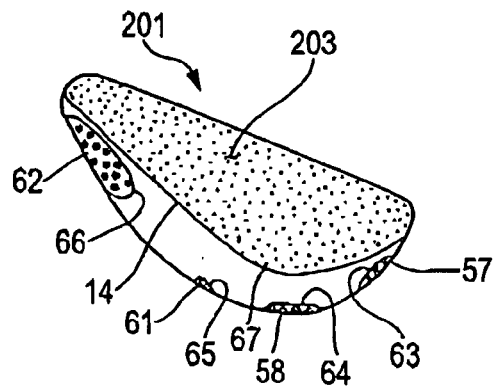
Figure 9:
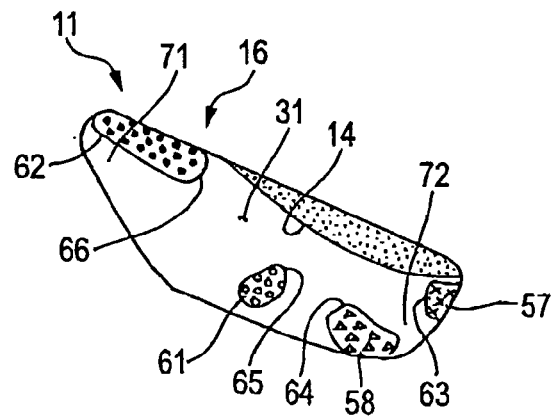
Figure 10:
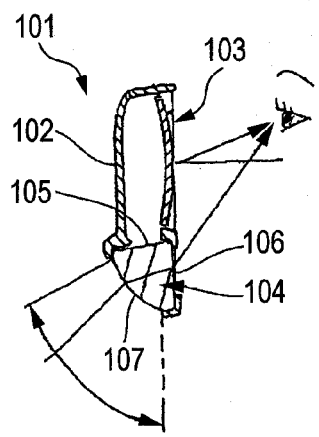
FIGS. 10(a) and 10(b) are diagrams which describe a basic configuration of the related art.
Figure 10:
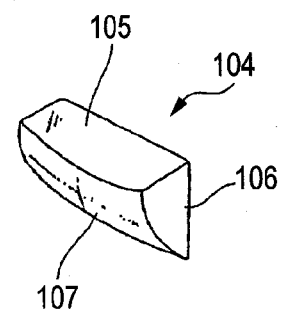

In FIG. 9(*b*), a transparent member (prism) 201 of the comparison example has a light incident surface 202, a light emitting surface 203, both of which are formed into a flat plane, and a reflecting mirror surface 204 which is formed into a convex mirror.

In FIG. 9(*c*), in the transparent member (prism) 201 of the comparison example, only the lower corners 63, 64, 65, 66 of the respective objects 57, 58, 61, 62 are reflected on the light emitting surface 203, and ranges reflected are narrow.

In addition, an extent of the body (mainly, the outer panel 14 of the left front side door 13) of the vehicle 12 that is reflected on the light emitting surface 203 is large, and about 70% of the light emitting surface 203 is occupied by the body. Due to this, an area of the light emitting surface 203 on which objects, if any, are to be reflected becomes narrow, and hence it is difficult to grasp the existence of the objects 57, 58 61, 62.

Thus, when the reflecting mirror surface 204 is formed into the convex mirror, the extent of the body that is reflected is increased, resulting in an image (refer to a location 67) in which the contour of the body is reflected as being bent.

In FIG. 9(*d*), in the embodiment in which the transparent member 16 of the invention is used, not only the corners 63, 64, 65, 66 of the respective objects 57, 58 61, 62 but also portions of the respective objects 57, 58, 61 62 up to central portions thereof can be reflected, and the ranges of the objects to be reflected are widened.

In addition, the extent of the body (including the outer panel 14) that is reflected on the light emitting surface 31 occupies only about 15% thereof, which is small.

Thus, since the reflecting mirror surface 33 of the invention shown in FIG. 7 includes the central convex mirror surface portion 41 which is oriented further downwards than the end portions 43, 44 at the central portion of the reflecting mirror surface 33, the bending of the contour of the body is suppressed by the central convex mirror surface portion 41 which is oriented so downwards, thereby making it possible to obtain a natural image.

As shown in FIG. 8, in the transparent member 16, since the light incident surface 28 is the portion which is formed into the shape of the internally angled concave surface, the light incident surface 28 functions in the same manner as a concave lens, whereby the ranges of objects to be reflected can be widened without enlarging the transparent member 16. Consequently, the objects 57, 58, 61, 62 can be confirmed in an ensured fashion.

Since the reflecting mirror surface 33 shown in FIG. 4 is such that assuming that the radius of the central portion 39 relative to the transverse direction thereof is Rm and the radius of both the end portions 43, 44 which continue to the central portion 39 relative to the transverse direction thereof is R, the radius R is made larger than the radius Rm, the objects 57, 62 become smaller in no case at both end portions 71, 72 of the light emitting surface 31 shown in FIG. 9(*d*), the images that are reflected on the end portions 71, 72, for example, the objects 57, 62 can be visualized in a natural proportion to other objects reflected similarly.

Note that while the outside mirror system of the invention is described as being applied to a four-wheeled vehicle, the outside mirror system can be applied to a three-wheeled vehicle, there being caused no problem when applied to general vehicles.

The outside mirror system of the invention is suitable for vehicles.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. An outside mirror system comprising:
   a mirror which reflects a rearward view relative to a vehicle; and
   a transparent member which reflects an outside downward view relative to the vehicle, wherein
   the transparent member has a light incident surface which is formed so as to be oriented downwards, a light emitting surface which is formed so as to be oriented towards a driver and a reflecting mirror surface which has a reflecting member integrally attached thereto on an opposite side to the light emitting surface and is formed into a convex surface relative to the driver.

2. An outside mirror system as set forth in claim 1, wherein the light emitting surface is formed into the shape of an externally angled convex surface.

3. An outside mirror system as set forth in claim 2, wherein the light incident surface is formed into the shape of an internally angled concave surface.

4. An outside mirror system as set forth in claim 2, wherein the reflecting mirror surface includes at a central portion thereof and a central convex mirror surface portion which is oriented further downwards than end portions thereof.

5. An outside mirror system as set forth in claim 2, wherein assuming that a radius of the central portion of the reflecting mirror surface is Rm and a radius of the end portions thereof which continue to the central portion is R, the radius R is made larger than the radius Rm.

6. An outside mirror system as set forth in claim 1, wherein the light incident surface is formed into the shape of an internally angled concave surface.

7. An outside mirror system as set forth in claim 6, wherein the reflecting mirror surface includes at a central portion thereof and a central convex mirror surface portion which is oriented further downwards than end portions thereof.

8. An outside mirror system as set forth in claim 6, wherein assuming that a radius of the central portion of the reflecting mirror surface is Rm and a radius of the end portions thereof which continue to the central portion is R, the radius R is made larger than the radius Rm.

9. An outside mirror system as set forth in claim 1, wherein the reflecting mirror surface includes at a central portion thereof and a central convex mirror surface portion which is oriented further downwards than end portions thereof.

10. An outside mirror system as set forth in claim 9, wherein assuming that a radius of the central portion of the reflecting mirror surface is Rm and a radius of the end portions thereof which continue to the central portion is R, the radius R is made larger than the radius Rm.

11. An outside mirror system as set forth in claim 1, wherein assuming that a radius of the central portion of the reflecting mirror surface is Rm and a radius of the end portions thereof which continue to the central portion is R, the radius R is made larger than the radius Rm.

* * * * *